United States Patent
Tanaka et al.

(10) Patent No.: US 7,092,246 B2
(45) Date of Patent: *Aug. 15, 2006

(54) APPARATUS FOR CONNECTING A DISPLAY TO A BODY CASE OF AN ELECTRONIC DEVICE

(75) Inventors: Toshiyuki Tanaka, Laguna Niguel, CA (US); Hiroyuki Kusaka, Tokyo (JP); Hiroshi Nakamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 231 days.

This patent is subject to a terminal disclaimer.

(21) Appl. No.: 10/717,850

(22) Filed: Nov. 18, 2003

(65) Prior Publication Data

US 2005/0105258 A1   May 19, 2005

(51) Int. Cl.
*G06F 1/16* (2006.01)
(52) U.S. Cl. ..................................... 361/681; 361/683
(58) Field of Classification Search ........ 361/679–681, 361/683
See application file for complete search history.

(56) References Cited

U.S. PATENT DOCUMENTS

| | | |
|---|---|---|
| 5,168,423 A | 12/1992 | Ohgami et al. |
| 5,229,921 A | 7/1993 | Bohmer |
| 5,268,817 A | 12/1993 | Miyagawa et al. |
| 5,489,924 A | 2/1996 | Shima et al. |
| 5,548,478 A | 8/1996 | Kumar et al. |
| 5,644,469 A | 7/1997 | Shioya et al. |
| 5,949,408 A | 9/1999 | Kang et al. |
| 6,005,767 A | 12/1999 | Ku et al. |
| 6,094,341 A | 7/2000 | Lin |
| 6,125,040 A | 9/2000 | Nobuchi et al. |
| 6,196,850 B1 | 3/2001 | Dietz et al. |
| 6,231,371 B1 | 5/2001 | Helot |
| 6,282,082 B1 | 8/2001 | Armitage et al. |
| 6,396,687 B1 | 5/2002 | Sun et al. |
| 6,430,038 B1 | 8/2002 | Helot et al. |
| 6,437,973 B1 | 8/2002 | Helot et al. |
| 6,464,195 B1 | 10/2002 | Hildebrandt |
| 6,477,871 B1 | 11/2002 | Shaw et al. |
| 6,483,445 B1 | 11/2002 | England |
| 6,504,707 B1 | 1/2003 | Agata et al. |
| 6,519,143 B1 | 2/2003 | Goko |
| 6,519,148 B1 | 2/2003 | Nakagawa et al. |
| 6,634,204 B1 | 10/2003 | Gascoin |
| 6,654,234 B1 | 11/2003 | Landry et al. |
| 6,707,665 B1 | 3/2004 | Hsu et al. |
| 6,717,798 B1 | 4/2004 | Bell et al. |
| 6,774,870 B1 | 8/2004 | Mead, Jr. et al. |
| 6,816,365 B1 | 11/2004 | Hill et al. |

(Continued)

FOREIGN PATENT DOCUMENTS

JP   07-049725   2/1995

(Continued)

*Primary Examiner*—Yean-Hsi Chang
(74) *Attorney, Agent, or Firm*—Blakely Sokoloff Taylor & Zafman, LLP

(57) ABSTRACT

One aspect of an embodiment relates to an electronic device comprising a body case that comprises a first opening and a second opening. The first opening is configured as a conduit for a display interconnect coupled to a display of the electronic device. The second opening houses a display support mechanism, which is coupled to the display and the body case. The display support mechanism is adapted to horizontally rotate and translate the display. In addition, the second opening is configured to limit the horizontal rotation and translation of the display conducted by the display support mechanism.

13 Claims, 7 Drawing Sheets

U.S. PATENT DOCUMENTS

| | | |
|---|---|---|
| 6,829,140 B1 | 12/2004 | Shimano et al. |
| 6,842,338 B1 | 1/2005 | Iredale |
| 6,856,506 B1 | 2/2005 | Doherty et al. |
| 6,873,521 B1 | 3/2005 | Landry et al. |
| 6,912,121 B1 * | 6/2005 | Karidis et al. ............. 361/681 |
| 6,940,153 B1 | 9/2005 | Spencer et al. |
| 2003/0112590 A1 | 6/2003 | Shimano et al. |
| 2003/0142474 A1 | 7/2003 | Karidis et al. |
| 2003/0203747 A1 * | 10/2003 | Nagamine |
| 2003/0223190 A1 | 12/2003 | Hashimoto |
| 2004/0057197 A1 | 3/2004 | Hill et al. |
| 2005/0041380 A1 * | 2/2005 | Jeong |
| 2005/0052833 A1 | 3/2005 | Tanaka et al. |
| 2005/0105263 A1 | 5/2005 | Tanaka |

FOREIGN PATENT DOCUMENTS

| | | |
|---|---|---|
| JP | 10-055227 | 2/1998 |
| JP | 2000-228128 | 8/2000 |
| JP | 2002-222026 | 8/2002 |
| JP | 2003-044169 | 2/2003 |

\* cited by examiner

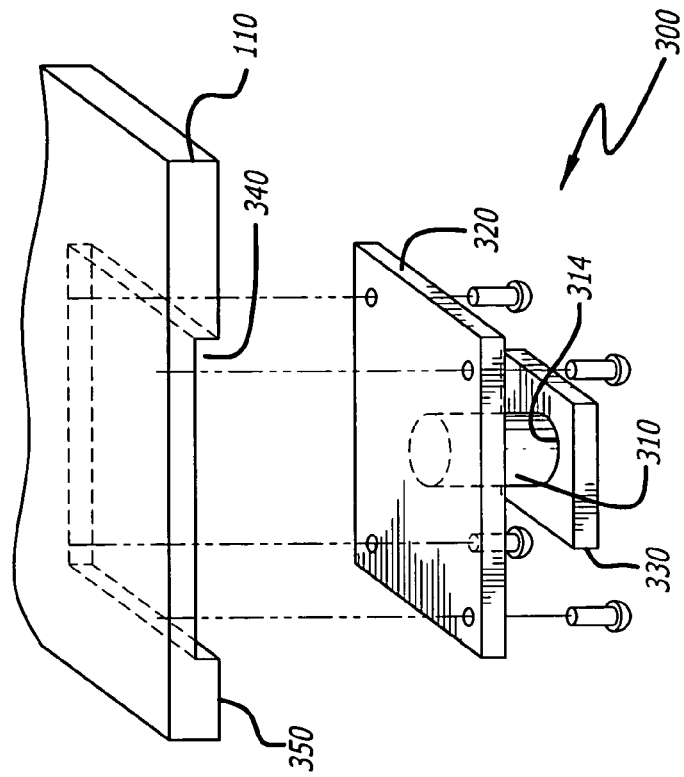
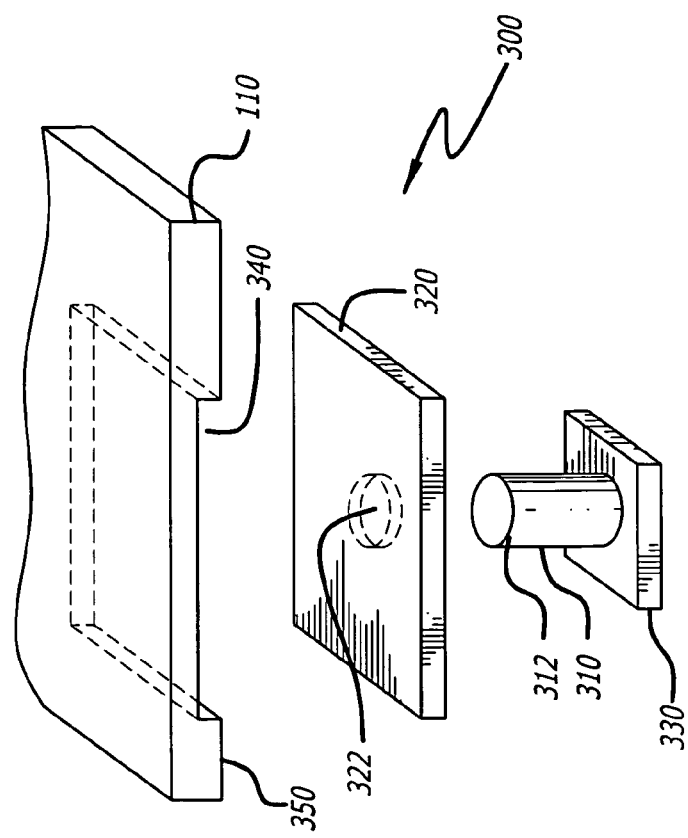

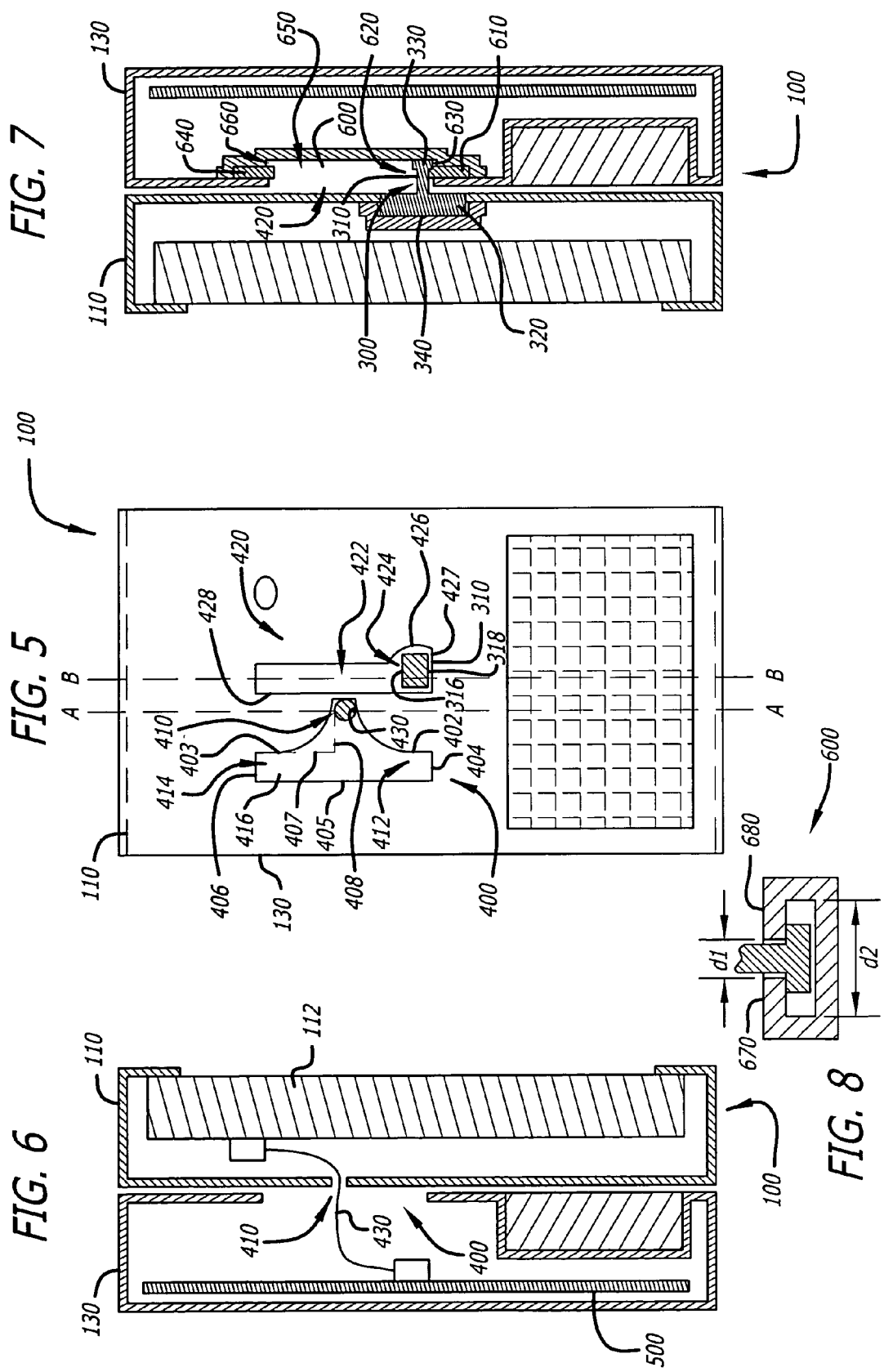

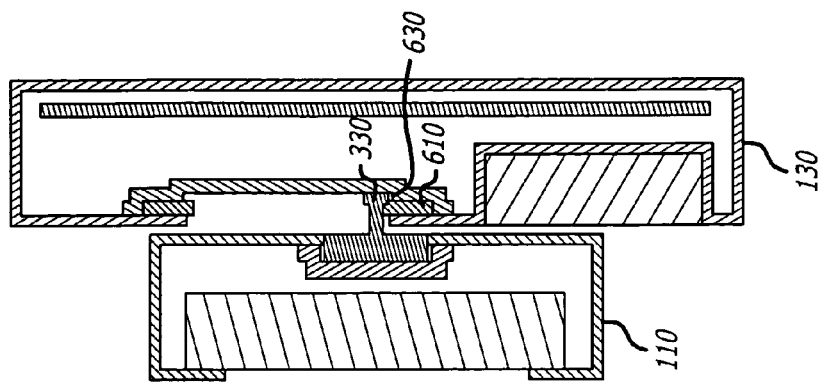
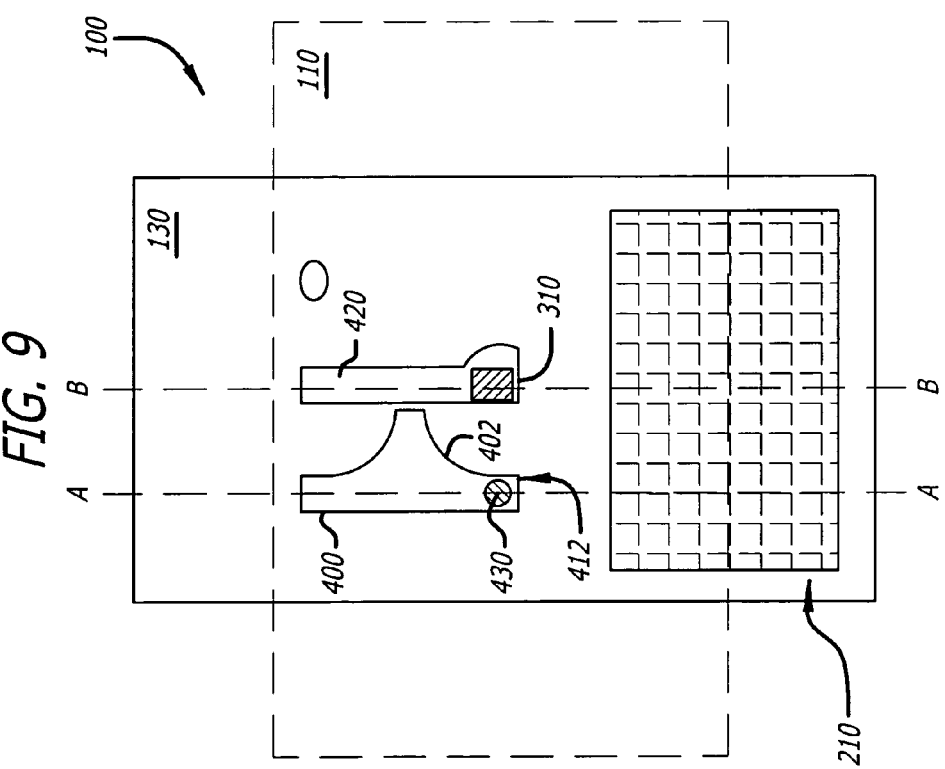
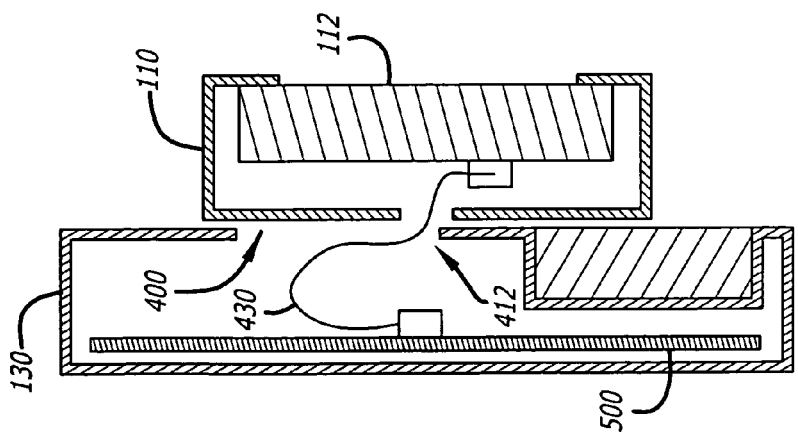

APPARATUS FOR CONNECTING A DISPLAY TO A BODY CASE OF AN ELECTRONIC DEVICE

FIELD

Embodiments of the invention generally relate to the field of electronics.

GENERAL BACKGROUND

Over the past few years, there has been increased demand for tablet computers, especially in light of their portability. Operating from either external or portable power sources, conventional tablet computers feature a liquid crystal display (LCD) connected to and mounted on a body case.

According to one type of conventional tablet computer, the LCD is rotationally attached to the body case by a cylindrical shaft as described in a published Japanese Application No. JP-A-10-55227. As a result, the computer can operate either as a tablet computer when the LCD is positioned directly above the body case or as a laptop computer when the LCD is horizontally rotated about the shaft by approximately 180 degrees to fully exposed the keyboard.

For this conventional tablet computer, the shaft operates as a conduit for a display cable that electrically connects the LCD to circuitry within the body case. Hence, the shaft is designed to overlap the display cable in order to prevent the cable from being damaged during horizontal rotation of the LCD. However, this overlapping architecture possesses a number of disadvantages.

For instance, one disadvantage is that the tablet computer must be constructed with a predetermined thickness in order to provide sufficient clearance for the display cable upon exiting the shaft. Otherwise, when the LCD is rotated, the display cable may become crushed or pressed against the edges of the shaft. This will likely cause accelerated wear of the display cable, which may lead to increased reliability problems. As a result, thinner tablet computers cannot be developed without addressing this potential reliability concern.

BRIEF DESCRIPTION OF THE DRAWINGS

Features and advantages of embodiments of the invention will become apparent from the following detailed description in which:

FIGS. 4A and 4B are exploded views of an exemplary embodiments of a display support mechanism.

FIG. 5 is an overhead view of an exemplary embodiment of the electronic device with the display placed in the first position.

FIG. 6 is a cross-sectional view of the electronic device of FIG. 5 along a cross-sectional line A—A.

FIG. 7 is a cross-sectional view of the electronic device of FIG. 5 along a cross-sectional line B—B.

FIG. 8 is an exemplary embodiment of a slot illustrated in FIG. 7 for maintaining the display support mechanism.

FIG. 9 is an overhead view of an exemplary embodiment of the electronic device with the display placed in the second position.

FIG. 10 is a cross-sectional view of the electronic device of FIG. 9 along a cross-sectional line A—A.

FIG. 11 is a cross-sectional view of the electronic device of FIG. 9 along a cross-sectional line B—B.

DETAILED DESCRIPTION

Embodiments of the invention set forth in the following detailed description generally relate to a display support mechanism that is deployed within a body case of an electronic device and is physically separate from a display interconnect. The body case comprises a plurality of openings, which may be pre-formed apertures to enable access to the interior of the body case. One opening is configured and positioned to minimize wear and tangling of the display interconnect. Another opening is configured and positioned to enable limited rotation and translation of the display support mechanism and the display attached thereto. Collectively, these openings enable thinner portable computers to be produced.

In the following description, certain terminology is used to describe various features of one or more embodiments of the invention. For instance, an "electronic device" is defined as an electronic product with a flat panel display that can be rotated and translated (i.e., translated). In this detailed description, for clarity sake, the electronic device is illustrated as a hand-held tablet computer that can be converted to a free-standing, portable computer. However, it is evident that the invention may be utilized in other types of electronic devices including, but not limited or restricted to personal digital assistants, cellular telephones, digital cameras, video cameras, navigation systems, and the like.

Herein, the term "rotate" as well as varying tenses thereof is generally defined as the angular movement about an axis of rotation. Normally, the axis of rotation is fixed. For this detailed description, when used to denote a direction of rotation, the term "vertically rotate" (or any tense thereof) relates to rotation about a generally horizontal axis of rotation. Similarly, the term "horizontally rotate" (or any tense thereof) relates to rotation about a generally vertical axis of rotation. The terms "translate", "translation" or any tense thereof are defined as linear movement.

The term "interconnect" is any medium that is capable of transferring electrical signals from one point to another. Examples of an interconnect may include one or more electrical wires, any type of cable (e.g., flexible printed cable), optical fiber, or the like. A "display interconnect" is simply an interconnect coupled at one end to a display such as a flat panel display.

Figure 1:
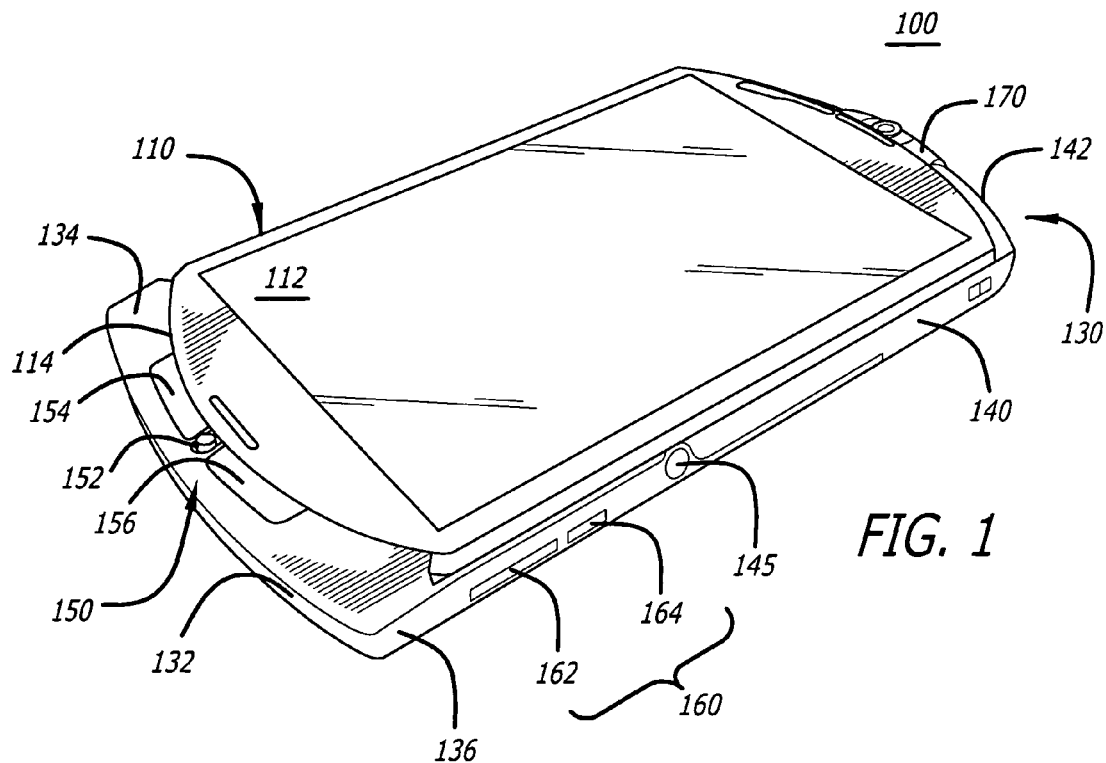
FIG. 1 is a perspective view of an exemplary embodiment of an electronic device with a display placed in a first position.
Figure 2:
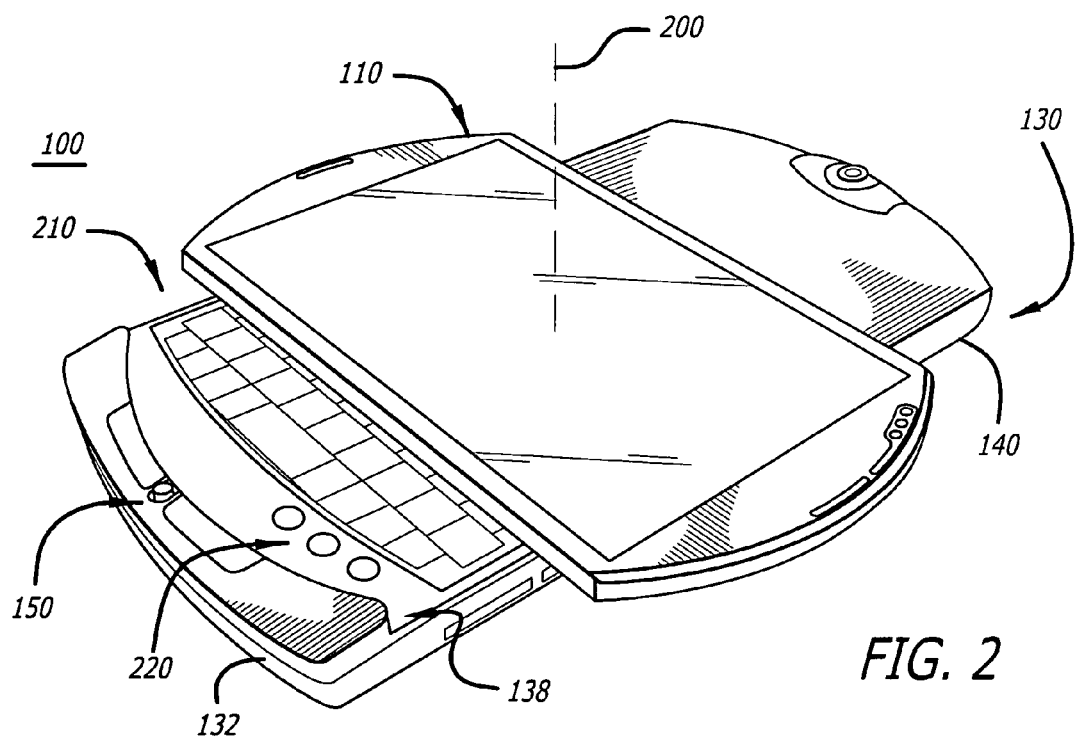
FIG. 2 is a perspective view of an exemplary embodiment of the electronic device of FIG. 1 with the display placed in a second position.
Figure 3:
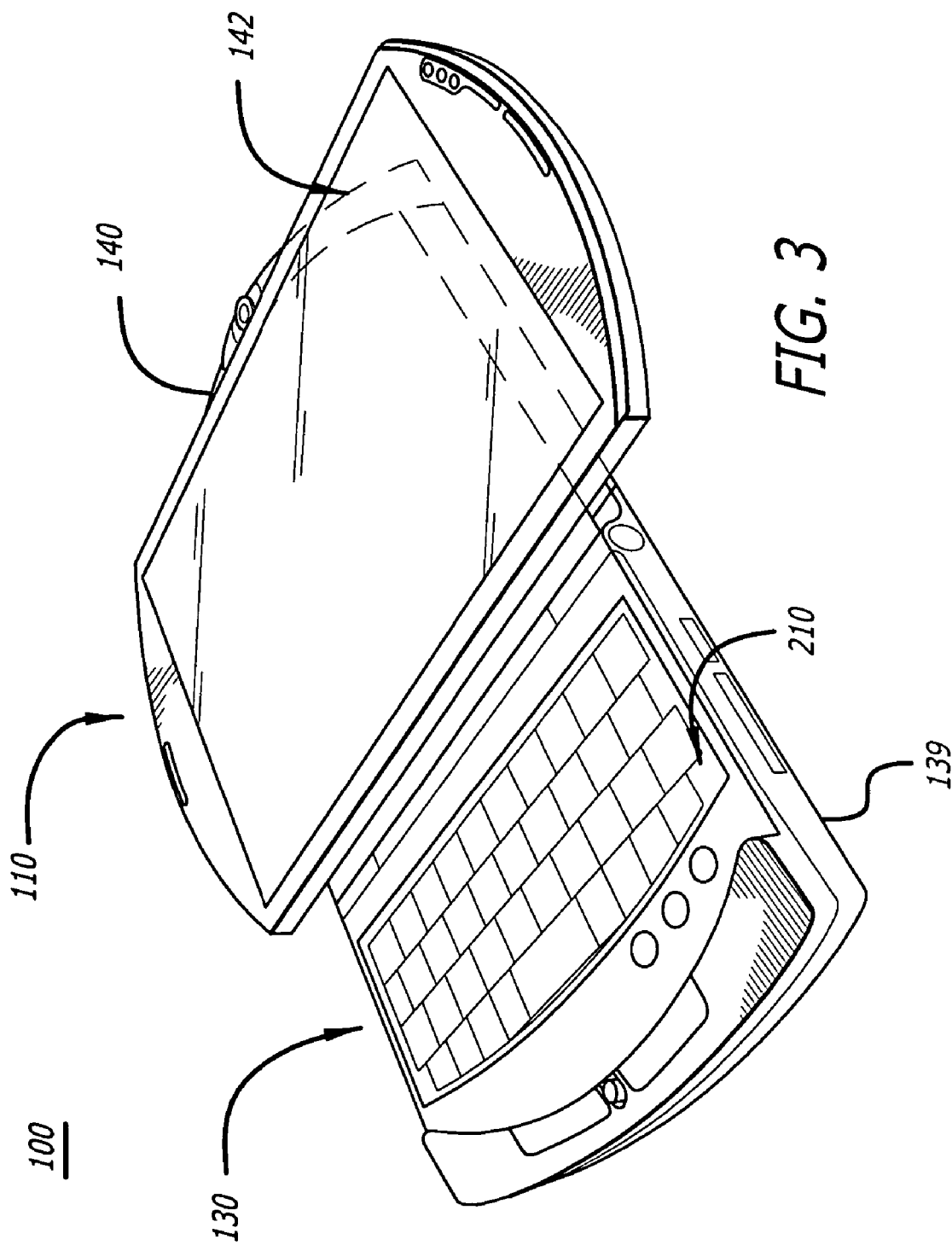
FIG. 3 is a perspective view of an exemplary embodiment of the electronic device of FIG. 1 with the display placed in a third position.

In general, FIGS. 1–3 provide perspective views of an exemplary embodiment of an electronic device 100. The electronic device 100 comprises a display 110, which is rotationally mounted on a body case 130. In addition, the display 110 may be translated from a centralized location toward one end of the body case 130.

As shown, the electronic device 100 operates as a tablet computer when the display 110 is placed in a first position (see FIG. 1). In this position, the display 100 is in a "portrait" orientation. In order for the electronic device 100 to operate as a portable computer, according to one embodiment of the invention, the display 110 is initially rotated and placed in a second position (see FIG. 2). Then, the display 110 is translated toward an end of the body case 130 and placed in a third position (see FIG. 3). In both of these positions, the display 110 is in a "landscape" orientation.

More specifically, as shown in FIG. 1, the display 110 houses a flat panel display 112 as well as circuitry (not shown) for generating a displayable image on the flat panel display 112. Examples of the flat panel display 112 include, but are not limited or restricted to a liquid crystal display (LCD), a plasma display or the like.

When placed in the first position, the display 110 covers at least seventy percent of the top surface area of the body case 130. According to one embodiment of the invention, the display 110 is configured to leave a cursor control device 150 accessible at all times, regardless of the selected position of the display 110. As an alternative embodiment, although not shown, the display 110 may be configured to cover the cursor control device 150 when the display 110 is in the first position.

The body case 130 comprises a first casing 132 and a second casing 140, which are rotationally coupled together by a hinge 145. According to one embodiment of the invention, the hinge 145 features one or more friction hinges (e.g., brake hinge). It is contemplated, however, that the hinge 145 need not include friction hinges when there is no need for maintaining the display 110 at an angled position.

Herein, the first casing 132 features the cursor control device 150 and a keyboard (not shown). The cursor control device 150 comprises a cursor guide 152 and one or more select buttons (e.g., buttons 154 and 156), which are positioned on a raised area 134 of the first casing 132. The raised area 134 is contoured to be complementary with a curvature of an edge 114 of the display 110.

For this embodiment of the invention, the cursor guide 152 enables a user to adjust the position of a cursor displayed on the flat panel display 112. The cursor guide 152 may be configured in a variety of arrangements such as a track ball, touch pad or even a tactile device as shown. The dual select buttons 154 and 156 mimic the "left-select" and "right-select" buttons of a desktop mouse.

Additionally, one or more interfaces 160 are implemented along an edge 136 of the first casing 132. For instance, a first interface 162 may be configured as a bay for receipt of a portable memory device such as one or more of the following: a memory card (e.g., PCMCIA card), a digital versatile disc (DVD) or compact disc (CD), a digital tape, or a floppy disk. A second interface 164 may be configured as a communication port for receipt of an adapter of a peripheral device such as a printer, a modem, a desktop mouse, or another electronic device. Thus, the second interface 164 may be configured as a Universal Serial Bus (USB) port in accordance with USB version 2.0, a PS/2 port, an RJ-11 jack, an RS-232 connector or the like. Although not shown, it is contemplated that the interfaces 160 may be position at the second casing 140 in lieu of the first casing 132.

As further shown in FIG. 1, an optional camera 170 may be rotationally coupled to a top edge 142 of the second casing 140. Such coupling may be accomplished by a friction hinge. It is contemplated that the friction hinge may be biased to maintain the camera 170 in an upward facing direction to mitigate damage to the lens of the camera 170 during storage and transport.

Referring now to FIG. 2, an exemplary embodiment of the electronic device 100 with the display 110 placed in a second position is shown. Mounted on a display support mechanism (not shown), the display 110 is horizontally rotated about an axis of rotation 200, which is located through the center of the display 110. Thus, when rotated approximately ninety degrees (90°) from the first position, the display 110 covers those portions of the first casing 132 and the second casing 140 adjacent to the hinge 145 of FIG. 1.

According to one embodiment of the invention, the display 110 to horizontally rotates only in a single direction such as in a clockwise (CW) or counter-clockwise (CCW) direction. The direction of rotation is restricted in order to prevent unwanted rotation of the display 110. As an alternative embodiment, the display 110 may be configured to rotate in both the CW and CCW directions.

As the display 110 is rotated, a keyboard 210, integrated into a recessed area 138 of the first casing 132, is partially exposed. The keyboard 210 includes a plurality of keys associated with alphanumeric characters and arranged in a manner consistent with a standard computer keyboard. However, the keyboard 210 is less than one-half the size of a normal portable computer keyboard.

In addition to the keyboard 210, one or more hot keys 220 integrated into the recessed area 138 of the first casing 132 are exposed. A "hot key" is a single key or a combination of keys that, when depressed, perform a task more quickly than by selecting entries from menus via the cursor control device 150. These tasks can be specified and programmed at manufacture or can be programmed by the user. Examples of tasks controlled by the hot keys 220 include starting an application, establishing network connectivity, commencing a power-down procedure, or the like.

Referring now to FIG. 3, a perspective view of an exemplary embodiment of electronic device 100 is shown after the display 110 has been translated toward the top edge 142 of the second casing 140. Herein, the display 110 is now placed in the third position, where the keyboard 210 is fully exposed. Also, the display 110 is entirely positioned over the second casing 140. This allows the second casing 140 and the display 110 to be vertically rotated. Where the hinge 145 is a brake hinge, both the second casing 140 and the display 110 may be maintained at a selected angle ($\alpha$, where $\alpha \leq 90$) from a bottom surface 139 of the first casing 132.

Referring now to FIGS. 4A–4B, exploded views of exemplary embodiments of a display support mechanism 300 are shown. Of course, the display support mechanism 300 may be produced in a variety of physical configurations other than those illustrated. Regardless of its configuration, the display support mechanism 300 is configured to enable the display 110 to be rotated and translated over the body case 120.

For each of these embodiments, illustrated in FIGS. 4A and 4B, the display support mechanism 300 comprises a shaft 310 interconnecting a fastening element 320 and a securing element 330. Both the shaft 310 and elements 320 and 330 may be made of a rigid composition such as hardened plastic, metal, or the like. The shapes of the fastening and securing elements 320 and 330 are a design choice.

According to one embodiment of the invention, as shown in FIG. 4A, the shaft 310 and securing element 330 are formed together as the same element. The shaft 310 comprises a first end 312 adapted for coupling to the fastening element 320. For instance, the first end 312 may be sized and configured for insertion into a cavity 322 of the fastening element 320, and thereafter, is retained by the fastening element 320.

As an example, the first end 312 may be a "snap-on" insert that is adapted to mate with a complementary female cavity 322 located on the fastening element 320. Alternatively, as another example, the first end 312 may be coupled to the fastening element 320 by another conventional coupling technique such as threads, welding, gluing, or the like.

According to another embodiment of the invention, as shown in FIG. 4B, the shaft 310 and fastening element 320 may be formed together as a single element. The shaft 310 comprises a second end 314 that is coupled to the securing element 330 by utilizing any coupling technique. Of course, it is contemplated that the shaft 310 and elements 320, 330 may be configured as a single unit.

Herein, as further shown in both FIGS. 4A and 4B, the fastening element 320 is adapted for insertion into a socket 340 generally formed at the center of a bottom surface 350 of the display 110. The socket 340 is formed to securely retain the fastening element 320 inserted therein or additional fasteners (e.g., screws, rivets, etc.) may be used as shown in FIG. 4B. This enables the display 110 to be rotated and translated in response to rotation and translation of the display support mechanism 300.

Of course, it is contemplated that the fastening element 320 may be integrated into the display 110 or pre-formed as part of the display 110. For these embodiments, the display support mechanism 300 would comprise the shaft 310 adapted to the fastening element 320 (or display 110) and the securing element 330.

Referring to FIG. 5, an overhead view of an exemplary embodiment of the electronic device 100 with the display 110 placed in the first position is shown. Herein, the body case 130 comprises a first opening 400 and a second opening 420. These openings 400 and 420 are formed within the second casing in close proximity to the center of the body case 130.

For this embodiment of the invention, the first opening 400 is adapted as a conduit for a display interconnect 430, which is used to electrically couple the flat panel display with circuitry (e.g., digital-to-analog converter, processor, chipset, memory, etc.) housed within the body case 130. The first opening 400 includes a plurality of perimeter edges 402–406. The first and second perimeter edges 402 and 403 collectively form a first interconnect retention area 410. Similarly, the first, third and fourth perimeter edges 402, 404 and 405 form a second interconnect retention area 412, while the second, fourth and fifth perimeter edges 403, 405 and 406 form a third interconnect retention area 414. A channel 416 is formed between retention areas 412 and 414.

As described herein, the display interconnect 430 resides in the retention area 410 when the display 110 is placed in the first position. The display interconnect 430 also resides in retention areas 412 and 414, when the display 110 is in the second and third positions, respectively.

For this embodiment of the invention, the first perimeter edge 402 is configured with a convex curvature, shaped as an arc, to provide a smooth transition of the display interconnect 430 between retention areas 410 and 412. It is contemplated that the radius of the arc may be equal to the distance between the center of the body case 130 and the display interconnect 430. However, in other embodiments, the radius of the arc may be sized differently.

Herein, the second perimeter edge 403 is configured with an arc shaped curvature that is a mirror image of the first perimeter edge 402. However, it is contemplated that the second perimeter edge 403 may be substituted for generally straight perimeter edges 407 and 408 as represented by dashed lines.

The other perimeter edges 404–406 generally form the channel 416 over which the display interconnect 430 can be moved between the second retention area 412 and the third retention area 414 as described below.

Referring still to FIG. 5, the second opening 420 is shaped to limit the angle of rotation and translation of the shaft 310 of the display support mechanism 300. For this embodiment of the invention, the second opening 420 is keyhole-shaped with a linear channel portion 422 and an expanded portion 424 positioned adjacent to one end of the channel portion 422. In one embodiment, the expanded portion 424 is positioned at the center of the body case 130.

Defined by perimeter edges 426, 427 and a portion of perimeter edge 428, the expanded portion 424 is generally wider than the channel portion 422. This allow for rotation of the shaft 310 when the display 110 is adjusted between the first position (portrait orientation) and the second position (landscape orientation).

For this embodiment of the invention, the shaft 310 has a rectangular cross-sectional area having a length (L) exceeding the width of the channel portion 422 and a width (W) slightly less than the width of the channel portion 422. The positioning and shape of the shaft 310 are selected to restrict rotation and translation of the display 110 attached thereto. For instance, when the shaft 310 is situated in a "lengthwise" orientation as shown, translation of the display support mechanism 300 is precluded because a first side 316 of the shaft 310, perpendicular to a translation path provided by the channel 422, exceeds the width of the channel 422.

As further shown in FIG. 5, the cross-sectional shape of the shaft 310 along with the shape of the perimeter edge 426 enable counter-clockwise (CCW) rotation of the shaft 310 by approximately ninety degrees (90°). However, any rotation beyond ninety degrees (and perhaps a few degrees of tolerance) is precluded since the first side 316 of the shaft 310 would come into contact with the perimeter edge 428. Similarly, the cross-sectional shape of the shaft 310 discourages CW rotation of the display 110 when placed in the first position. Normally, a second side 318 of the shaft 310 will come into contact with perimeter edge 427 upon commencement of such rotation (e.g., prior to completion of ten degrees of CW rotation).

Referring now to FIG. 6, a cross-sectional view of the electronic device 100 of FIG. 5 along a cross-sectional line A—A is shown. The display interconnect 430 passes through the first retention area 410 of the first opening 400 and resides within the display 110 and the body case 130. In particular, the display interconnect 430 electrically couples a circuit board 500 housed within the body case 130 with the flat panel display 112 housed within the display 110.

Referring now to FIG. 7, a cross-sectional view of the electronic device 100 of FIG. 5 along a cross-sectional line B—B is shown. Herein, the fastening element 320 of the display support mechanism 300 is inserted into the socket 340 and coupled to the display 110. Therefore, any rotation or translation of the display support mechanism 300 causes corresponding rotation or translation of the display 110.

As shown, the second opening 420 constitutes an opening for a slot 600 having a depth less than the length of the shaft 310 of the display support mechanism 300. The slot 600 is configured to enable rotation and translation of the display support mechanism 300. As an option, the slot 600 may also be configured to restrict rotation of the display support mechanism 300, and thereby, restrict rotation of the display 110.

According to one embodiment of the invention, the slot 600 comprises a first retention element 610 situated at a first end 620 of the slot 600. The first retention element 610 provides a recess 630. When the display 110 is placed in the first position, the securing element 330 is partially inserted into the recess 630. The recess 630 is sized so that the first retention element 610 applies downward forces against the securing element 330. As a result, the display support mechanism 300 is maintained in this position even during rotation of the display 110. The securing element 330 is disengaged from the recess 630 only when lateral forces are applied for translation of the display 110.

As shown, the slot 600 further comprises a second retention element 640 situated at a second end 650 of the slot 600. The second retention element 640 is generally identical in construction to the first retention element 610 and provides a recess 660 sized to receive the securing element 330 of the display support mechanism 300.

As shown in FIG. 8, flanges 670 and 680 may be attached to sidewalls of the slot 600. These flanges 670 and 680 extend toward each other so that the distance (d1) between flanges 670 and 680 is wider than any side of the shaft 310, most notably a cross-sectional length of the shaft 310. The distance (d2) between sidewalls of the slot 600 is of sufficient length to allow rotation of the securing element 330, but prevent unwanted lateral movement (i.e., rocking) of the display support mechanism 300.

Referring now to FIG. 9, an overhead view of an exemplary embodiment of the electronic device 100 with the display 110 placed in the second position is shown. Herein, the display 110 is now substantially centered over the body case 130. As a result, a portion of the keyboard 210 is visible.

After rotation of the display 110 by approximately ninety degrees (90°) in the CCW direction, the display interconnect 430 has moved along the first perimeter edge 402 from the first retention area 410 to the second retention area 412. In addition, the display support mechanism 300 has been rotated by ninety degrees (90°) in the CCW direction. As a result, the shaft 310 is rotated accordingly, and therefore, is now situated in a "width-wise" orientation where none of the sides of the shaft 310 that are perpendicular to the linear channel 422 exceed the width of the channel 422.

Referring now to FIG. 10, a cross-sectional view of the electronic device of FIG. 9 along a cross-sectional line A—A is shown. Upon rotation of the display 110, the display interconnect 430 is re-positioned through the first opening 400. Namely, the display interconnect 430 passes through the second retention area 412 of the first opening 400 and electrically couples the circuit board 500 housed within the body case 130 with the flat panel display 112 housed within the display 110.

Referring to FIG. 11, cross-sectional view of the electronic device of FIG. 9 along a cross-sectional line B—B is shown. Herein, the securing element 330 is rotated, but is still retained within the recess 630 formed by the retention element 610.

Figure 12:
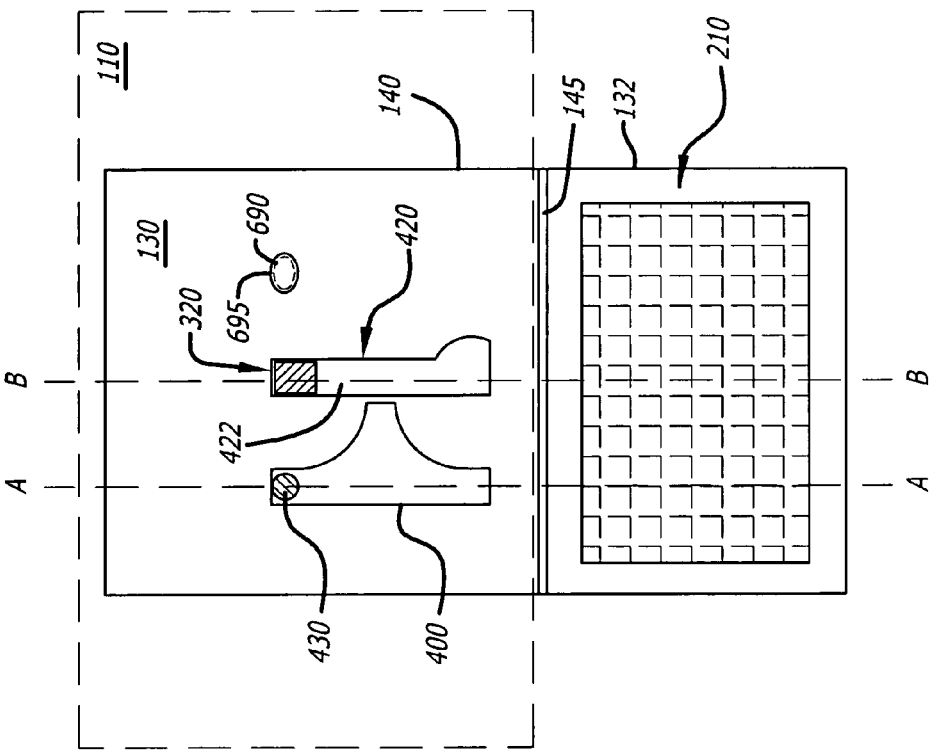
FIG. 12 is an overhead view of an exemplary embodiment of the electronic device with the display placed in the third position.

Referring now to FIG. 12, an overhead view of electronic device 100 with the display 110 placed in the third position is shown. Herein, as represented by the positioning of the shaft 310, the display support mechanism has been translated upward along the channel 422. Now, the keyboard 210 is fully accessible by the user.

When placed into the third position, the display 110 covers a substantial portion of the second casing 140 of the body case 130, but does not cover the hinge 145 or the first casing 132. As a result, the hinge 145 may be used to vertically rotate the second casing 140 and the display 110.

As an optional feature, the display 110 comprises one or more spring-loaded fasteners 690 which becomes engaged with a recessed area 695 of the body case 130 when the display 110 is placed in the third position. According to one embodiment of the invention, the spring-loaded fasteners 690 are detents to facilitate easier release when lateral forces are applied by the user to return the display 110 back to the second position.

Figure 13:
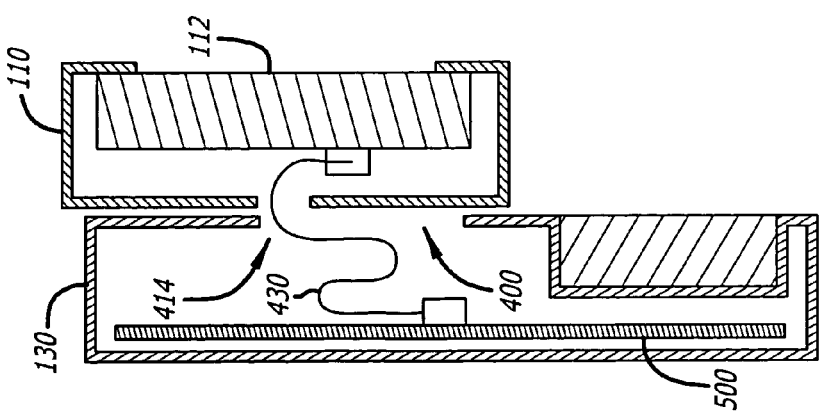
FIG. 13 is a cross-sectional view of the electronic device of FIG. 12 along a cross-sectional line A—A.

Referring now to FIG. 13, a cross-sectional view of the electronic device 100 of FIG. 12 along cross-sectional line A—A is shown. The display interconnect 430 passes through the third retention area 414 of the first opening 400 and electrically couples the circuit board 500 housed within the body case 130 with the flat panel display 112 housed within the display 110.

Figure 14:
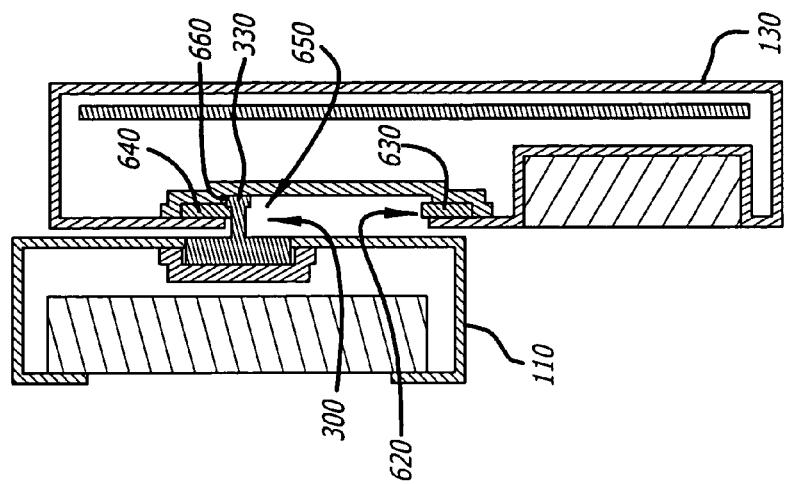
FIG. 14 is a cross-sectional view of the electronic device of FIG. 12 along a cross-sectional line B—B.

Referring now to FIG. 14, a cross-sectional view of the electronic device 100 of FIG. 12 along cross-sectional line B—B is shown. Herein, the securing element 330 of the display support mechanism 300 becomes disengaged from the recess 630. The display support mechanism 300 is moved from the first end 620 to the second end 650 of the slot 600. Thereafter, the securing element 330 is inserted into the second recess 660 formed by the second retention element 640.

Figure 15:
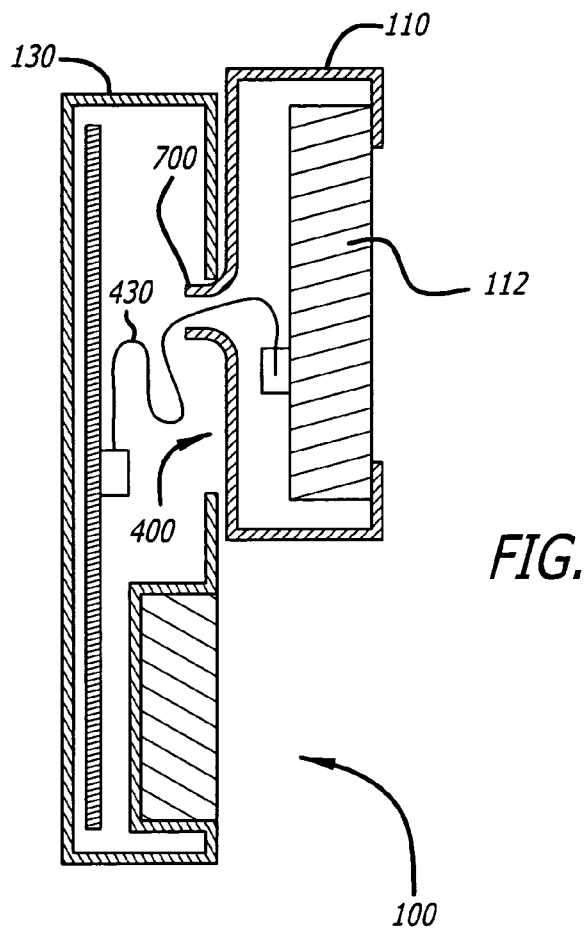
FIG. 15 is a cross-sectional view of an alternative embodiment of the first opening associated with the electronic device.

Referring now to FIG. 15, a cross-sectional view of an alternative embodiment of the first opening 400 associated with the electronic device 100 of FIGS. 5, 9 and 12 is shown. Herein, a protective member 700 operates in cooperation with the first opening 400 in order to provide the display interconnect 430 additional protection against wear. According to one embodiment of the invention, the protective member 700 may be an extension of the display 110 so as to partially protrude into the first opening 400 of the body case 130. According to another embodiment of the invention, the protective member 700 may be an insert placed on the perimeter edges forming the first opening 400. The protective member 700 may be made of a composition having a coefficient of friction less than the material forming the body case 130.

Figure 16:
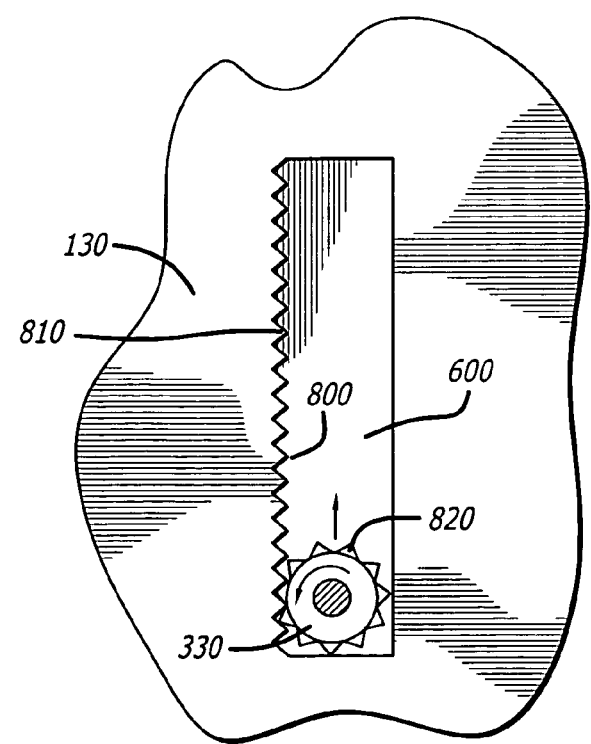
FIG. 16 an exemplary embodiment of the electronic device with the display support mechanism configured to support concurrent rotation and translation of the display.

As an alternative embodiment of the invention, it is contemplated that the transition of the electronic device 100 from a tablet PC orientation to a portable computer orientation may be accomplished by a two-position process, instead of a three-position process as described above. Namely, when rotated, the display 110 is translated toward the top end 142 of the body case 130. This requires the display 110 to be rotated and translated in a concurrent manner. Such operations may be accomplished by placement of a rack-and-pinion configuration within the slot 600 as shown in FIG. 16.

For this embodiment of the invention, the slot 600 (positioned in the body case 130) comprises a rack 800, namely a plurality of protrusions along a first sidewall 810 of the slot 600. These protrusions are engaged with protrusions 820 placed on the securing element 330 of the display support mechanism 300 when the securing element 330 is rotated. As a result, the display support mechanism is translated during rotation as denoted by the arrow. Since the display support mechanism is fixedly coupled to the display, the display is concurrently rotated and translated as well.

While certain exemplary embodiments of the invention have been described and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible.

What is claimed is:

1. An electronic device comprising:
   a display initially placed in a portrait orientation and capable of being horizontally rotated, about a vertical axis of rotation located proximate to a center of the display, for placement in a landscape orientation;
   a display interconnect in communication with the display;
   a display support mechanism securely coupled to the display, the display support mechanism comprises a shaft adapted to be horizontally rotated and to be translated from a first location to a second location; and
   a body case having an opening configured as a conduit for the display interconnect, and an opening for a slot adapted to permit horizontal rotation of the shaft in a single direction and to preclude translation of the shaft until after the display has been rotated and placed in the landscape orientation.

2. The electronic device according to claim 1, wherein the display support mechanism is adapted to concurrently rotate and translate the display.

3. An electronic device comprising:
   a display;
   a display support mechanism which supports the display; and
   a body case which includes an opening into which the display support mechanism is inserted, the opening being configured to enable a rotation of the display conducted by the display support mechanism between first and second positions and a sliding translation of the display conducted by the display support mechanism between the second position and a third position, and the opening limiting a sliding translation of the display conducted by the display support mechanism when the display is placed in the first position, allowing the rotation and sliding translation of the display conducted by the display support mechanism when the display is placed in the second position, and limiting a rotation of the display conducted by the display support mechanism when the display is placed in the third position.

4. The electronic device according to claim 3, wherein the opening includes a first opening portion and a second opening portion, and the first and second opening portions are configured such that,
   when the display is placed in the first position, the first and second opening portions allow the rotation of the display conducted by the display support mechanism and limit the sliding translation of the display conducted by the display support mechanism,
   when the display is placed in the second position, the first and second opening portions allow the rotation of the display conducted by the display support mechanism and the sliding translation of the display conducted by the display support mechanism, and
   when the display is placed in the third position, the first and second opening portions allow the sliding translation of the display conducted by the display support mechanism, the first opening portion limits the rotation of the display conducted by the display support mechanism, and the second opening portion allows the rotation of the display conducted by the display support mechanism.

5. The electronic device according to claim 3, wherein the display comprises a flat panel display.

6. The electronic device according to claim 3, wherein the display placed in the first position has a portrait orientation, and the display placed in each of the second and third positions has a landscape orientation.

7. The electronic device according to claim 3, wherein the body case includes a keyboard,
   when the display is placed in the first position, the display covers the keyboard,
   when the display is placed in the second position, the display partially covers the keyboard, and
   when the display is placed in the third position, all of the keyboard is exposed.

8. The electronic device according to claim 7, wherein the body case includes a cursor control device, the cursor control device is exposed when the display is placed in any of the first position, the second position and the third position.

9. The electronic device according to claim 7, wherein the display placed in the first position has a portrait orientation, and the display placed in each of the second and third positions has a landscape orientation.

10. The electronic device according to claim 3, wherein the body case includes a circuit board,
    the opening includes a first opening portion and a second opening portion,
    the display support mechanism includes an interconnect interconnecting the display and the circuit board and inserted into the first opening portion and a shaft inserted into the second opening portion, and
    the first and second opening portions are configured such that,
    when the display is placed in the first position, the first and second opening portions allow the rotation of the display conducted by the display support mechanism and limit the sliding translation of the display conducted by the display support mechanism,
    when the display is placed in the second position, the first and second opening portions allow the rotation of the display conducted by the display support mechanism and the sliding translation of the display conducted by the display support mechanism, and
    when the display is placed in the third position, the first and second opening portions allow the sliding translation of the display conducted by the display support mechanism, the first opening portion limits the rotation of the display conducted by the display support mechanism, and the second opening portion allows the rotation of the display conducted by the display support mechanism.

11. The electronic device according to claim 10, wherein the first opening portion includes a plurality of perimeter edges forming a channel portion extending in the sliding translate direction of the display to allow the sliding translation of the interconnect,
    the second opening portion includes a plurality of perimeter edges forming a channel portion placed in a side of the channel portion of the first opening portion and extending in the sliding translate direction of the display to allow the sliding translation of the shaft and to limit the rotation of the shaft, the perimeter edges of the second opening portion further forms an expanded portion at one end of the channel portion to allow the rotation of the shaft, and the perimeter edges of the first opening portion further forms a side projecting portion projecting from the channel portion toward the channel portion of the second opening portion and having a curvature along which the interconnect is moved to allow the rotation of the display.

12. The electronic device according to claim 11, wherein the center of the curvature of the first opening portion is the center of the expanded portion of the second opening portion, and the radius of the curvature of the first opening portion from the center of the expanded portion of the second opening portion is equal to a distance between the interconnect and the shaft.

13. The electronic device according to claim 11, wherein a protective cover is provided on the first opening portion to reduce wear of the interconnect.

* * * * *